Feb. 5, 1929.

S. NERONI ET AL 1,701,051

ELECTRIC MOTOR

Filed Jan. 17, 1927    3 Sheets-Sheet 3

S. Neroni and
E. Valoppi  Inventors

Patented Feb. 5, 1929.

1,701,051

UNITED STATES PATENT OFFICE.

SPARTACO NERONI AND EUGENE VALOPPI, OF PITTSTON, PENNSYLVANIA.

ELECTRIC MOTOR.

Application filed January 17, 1927. Serial No. 161,700.

This invention relates to an electric motor of the variable speed type, one of the objects of the invention being to provide a motor the field coils of which can be shifted toward or from the armature, thereby to diminish or increase the intensity of the field and correspondingly increase or reduce the speed of rotation of the armature.

Another object of the invention is to provide novel means for slidably supporting the field coils whereby they can be shifted readily either prior to or during the operation of the motor.

A further object is to provide slidable supports for the field coils which are simple and durable in construction and readily accessible.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
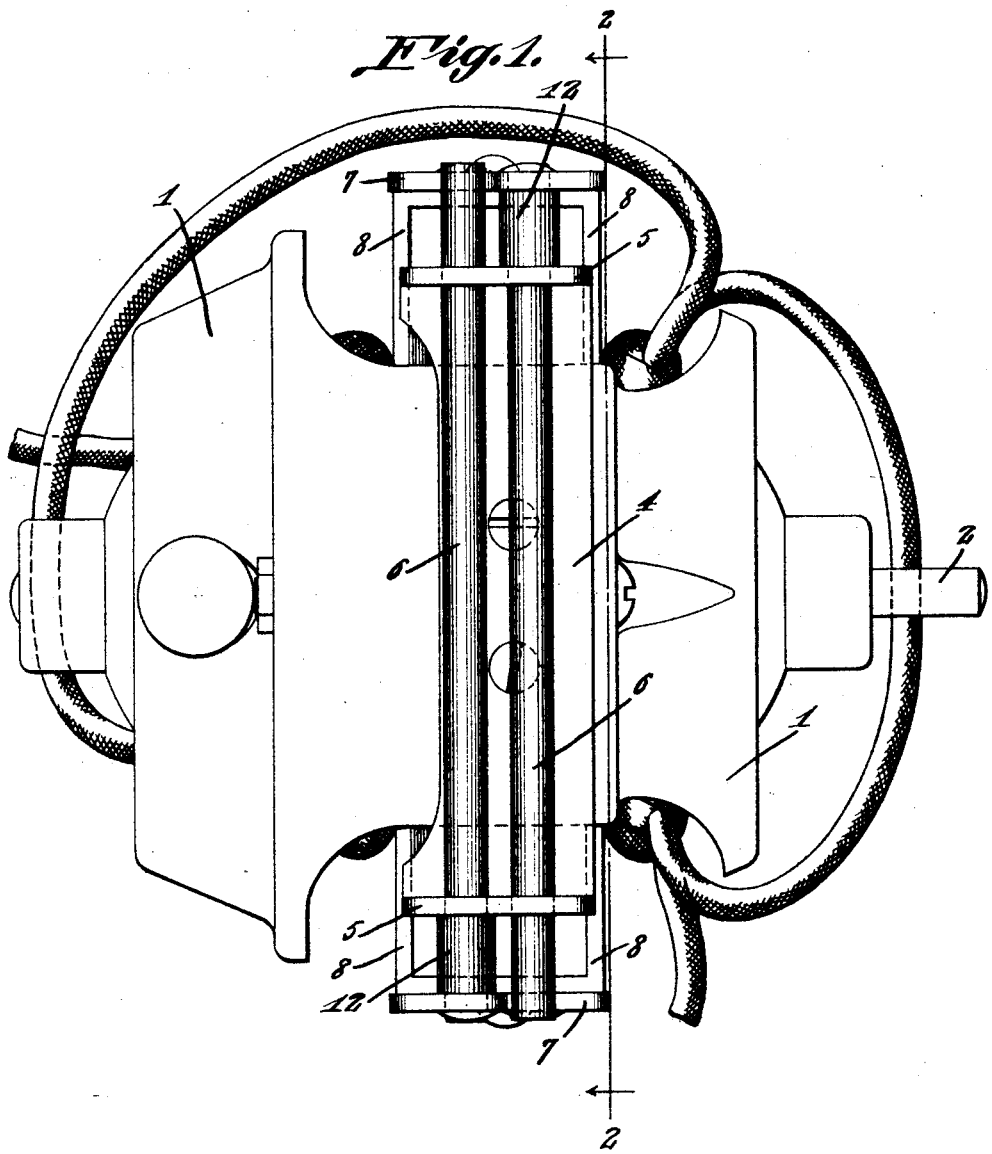
Figure 1 is a plan view of the motor.
Figure 2:
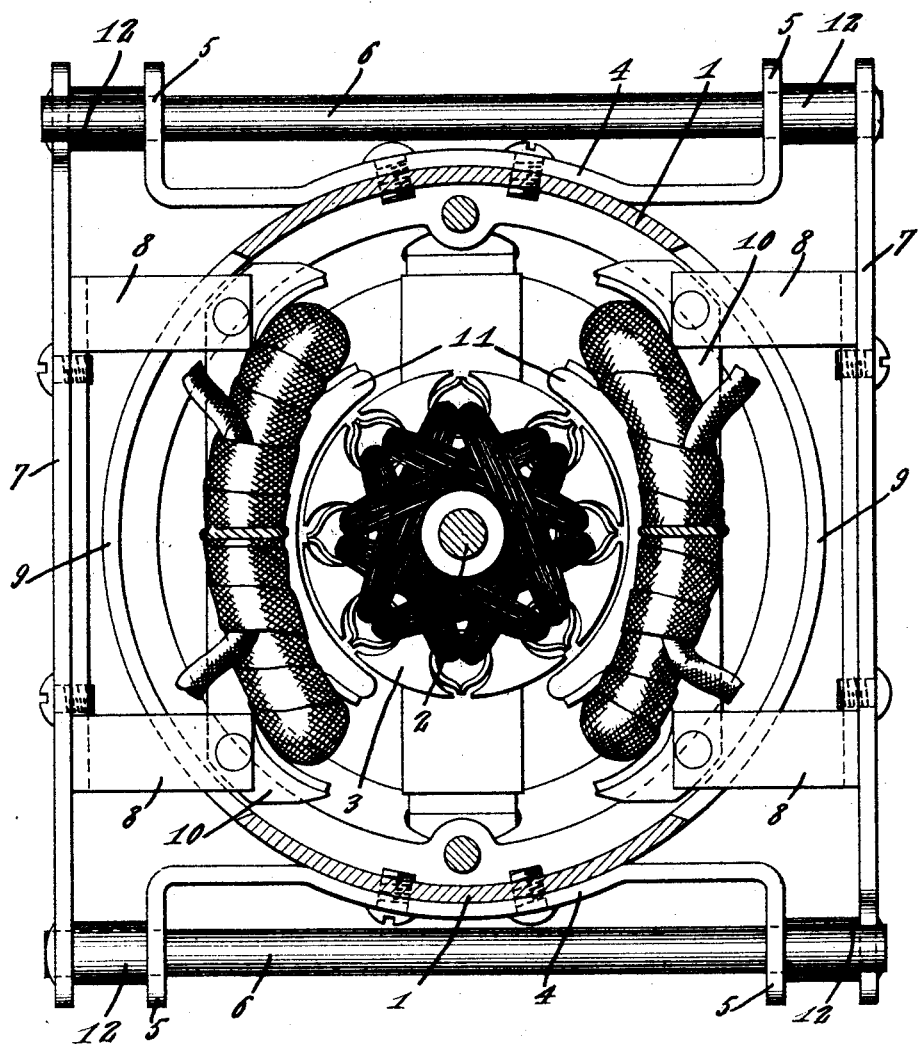
Figure 2 is a section on line 2—2, Figure 1.
Figure 3:
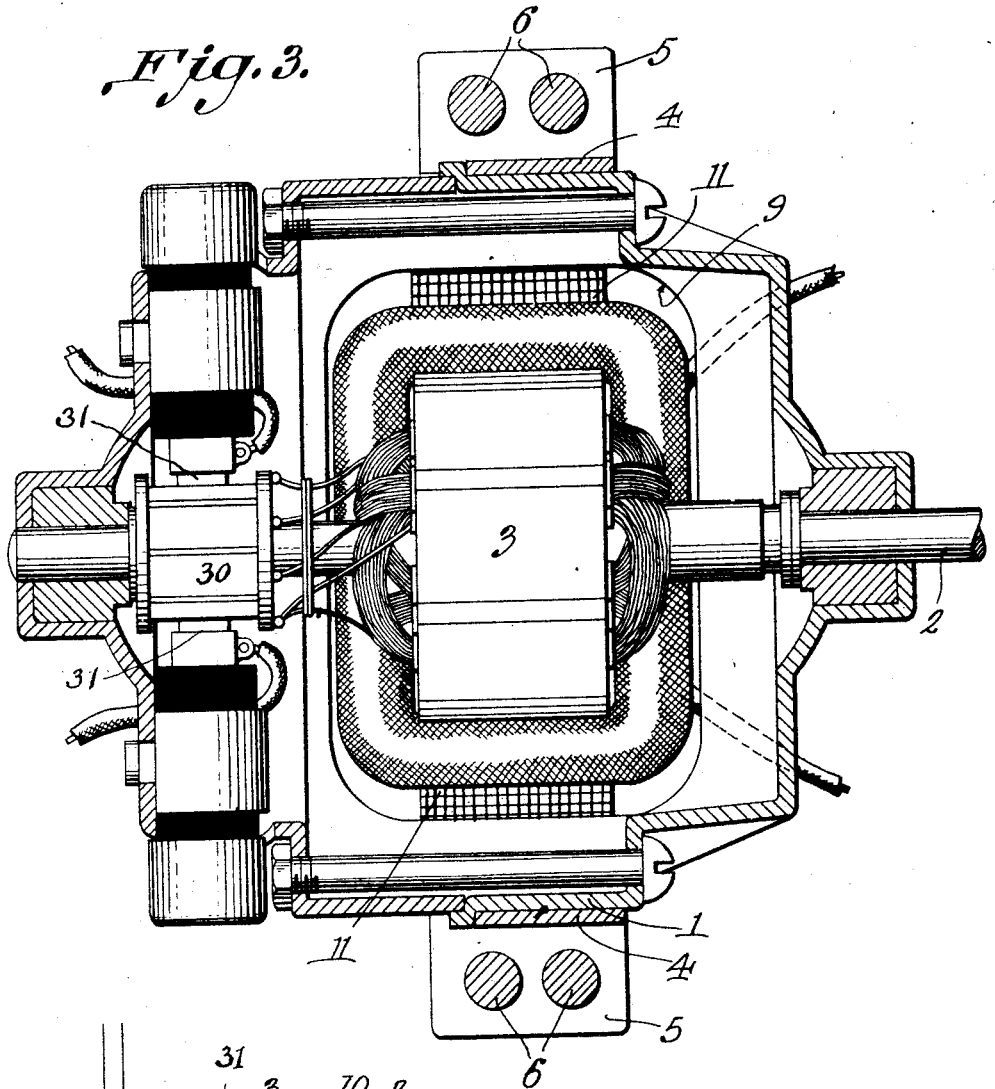
Figure 3 is a central transverse section, the armature, armature shaft, commutator and brushes being shown in elevation.
Figure 4:
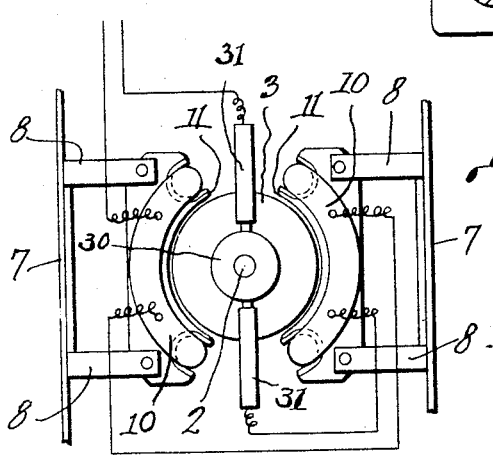
Figure 4 is a diagram of the motor.

Referring to the figures by characters of reference 1 designates a housing adapted to be supported in any desired manner and in this housing is journaled a shaft 2 carrying the armature 3 and the commutator 30 of the motor. The housing forms no part of the magnetic circuit. Brushes 31 cooperate with the commutator. Secured to the housing 1 at diametrically opposed points are brackets 4 having outstanding ears 5 arranged in pairs, these ears constituting guides for parallel rods 6.

Connecting one rod of each pair to one rod of the other pair is a cross head 7, two of these cross heads being provided, the same being located at diametrically opposed portions of the housing 1. When the cross heads are moved in opposite directions the respective rods to which they are connected move therewith within the guide ears 5. Brackets 8 are extended from the cross head 7 into slots 9 formed in the housing 1 and these brackets are attached to the arcuate laminated pole pieces 11 carrying the field coils 10. The pole pieces, each of which extend partly around the armature through approximately 65°, are normally located close to the armature 3 at which time the maximum speed of rotation of the armature will result. Field coils 10 are also extended partly around the armature, each coil being arcuate as shown so as to lie normally substantially concentric with the armature. It will be apparent that by moving the cross heads 7 away from each other the pole pieces will be correspondingly moved away from the armature, thus diminishing the field intensity and increasing the speed of rotation of the armature. By connecting the pole pieces to cross heads 7, as described, and by mounting each cross head on rods slidable within guides, the pole pieces are held positively against displacement and undesirable vibrations, and a very accurate adjustment can be effected simply by moving the pole pieces and sliding the rods in the guides.

A motor of the construction herein described is especially suitable for use in phonographs and similar structures, it being possible, by adjustment of the pole pieces to vary the speed of rotation of the mechanism driven by the motor.

As shown in the drawings the movement of the pole pieces toward the armatures can be limited by sleeves 12 carried by the rods at their points of attachment and constituting abutments for the ears 5.

What is claimed is:—

1. In an electric motor the combination with a housing, an armature therein, and opposed guides carried by the housing, of opposed cross heads, rods extending from the ends of each cross head and slidable within the guides, said cross heads being adjustable toward and from each other and supported by the rods and guides, arcuate pole pieces within the housing, arcuate field coils thereon, and connections between the pole pieces and the respective cross heads, said pole pieces being fixed relative to their cross heads.

2. In an electric motor an armature, opposed relatively fixed guides, opposed cross heads, rods extending from the ends of each cross head and slidable within the guides, said cross heads being adjustable toward and from each other independently and supported by the rods and guides, arcuate pole pieces within the housing oppositely disposed and normally concentric with the armature, arcuate field coils carried by the pole pieces and extending partly around the armature, connections between the pole pieces and the respective cross heads, said pole pieces being adjustable with the cross heads to vary the distance between the pole pieces and the armature and correspondingly varying the speed of rotation of the armature.

In testimony that we claim the foregoing as our own, we have hereto affixed our signatures.

SPARTACO NERONI.
EUGENE VALOPPI.